(12) United States Patent
Parrein et al.

(10) Patent No.: US 11,879,191 B2
(45) Date of Patent: Jan. 23, 2024

(54) DARKENING SCREEN

(71) Applicant: IFG EXELTO NV, Zwijnaarde (BE)

(72) Inventors: Tim Parrein, Oostakker (BE); Peter Ollevier, Mechelen (BE)

(73) Assignee: IFG EXELTO NV, Zwijnaarde (BE)

( * ) Notice: Subject to any disclaimer, the term of this patent is extended or adjusted under 35 U.S.C. 154(b) by 447 days.

(21) Appl. No.: 17/292,291

(22) PCT Filed: Nov. 8, 2019

(86) PCT No.: PCT/EP2019/080736
§ 371 (c)(1),
(2) Date: May 7, 2021

(87) PCT Pub. No.: WO2020/099275
PCT Pub. Date: May 22, 2020

(65) Prior Publication Data
US 2021/0392822 A1 Dec. 23, 2021

(30) Foreign Application Priority Data
Nov. 13, 2018 (EP) .................................. 18206073

(51) Int. Cl.
*B32B 27/02* (2006.01)
*D04B 21/14* (2006.01)
*B32B 5/26* (2006.01)

(52) U.S. Cl.
CPC .............. *D04B 21/14* (2013.01); *B32B 5/263* (2021.05); *B32B 2307/41* (2013.01);
(Continued)

(58) Field of Classification Search
CPC .............. A01G 2009/1461; A01G 9/14; A01G 9/1438; A01G 9/22; B32B 15/14;
(Continued)

(56) References Cited

U.S. PATENT DOCUMENTS 8,333,220 B2    12/2012   King

FOREIGN PATENT DOCUMENTS

AU           633870 B2    2/1993
EP        1 825 747 A1    8/2007
(Continued)

OTHER PUBLICATIONS

International Search Report of corresponding PCT/EP2019/080736, dated Jan. 8, 2020, 4 pages.
(Continued)

*Primary Examiner* — Lawrence D Ferguson
(74) *Attorney, Agent, or Firm* — Lewis Roca Rothgerber Christie LLP

(57) ABSTRACT

The darkening screen comprises two fabrics, namely a first fabric (10) which comprises in machining direction first strips of film material and first threads (2) in between the first strips, and a second fabric (11) which comprises in machining direction second strips of film material and second threads (6) in between the second strips. The first (2) and the second threads (6) of the first (10) and the second fabric (11) have water transporting capacity. In order to obtain improved moisture transporting properties whilst maintaining a low hemispherical light transmission the first threads (2) are aligned with said second threads (6) and are situated, in a direction perpendicular to said first (10) and second fabric (11), opposite to said second threads (6) to form pairs of first and second threads. In a number of these pairs the first thread (2) is connected at different locations by cross-connections (16) to the second thread (6), more particularly by means of a first yarn (4) of the first fabric which extends in the cross-machining direction, to thereby fix the first fabric (10) to the second fabric (11). The cross-connections (16) preferably hold the first threads (2) at least at the
(Continued)

Figure 1:
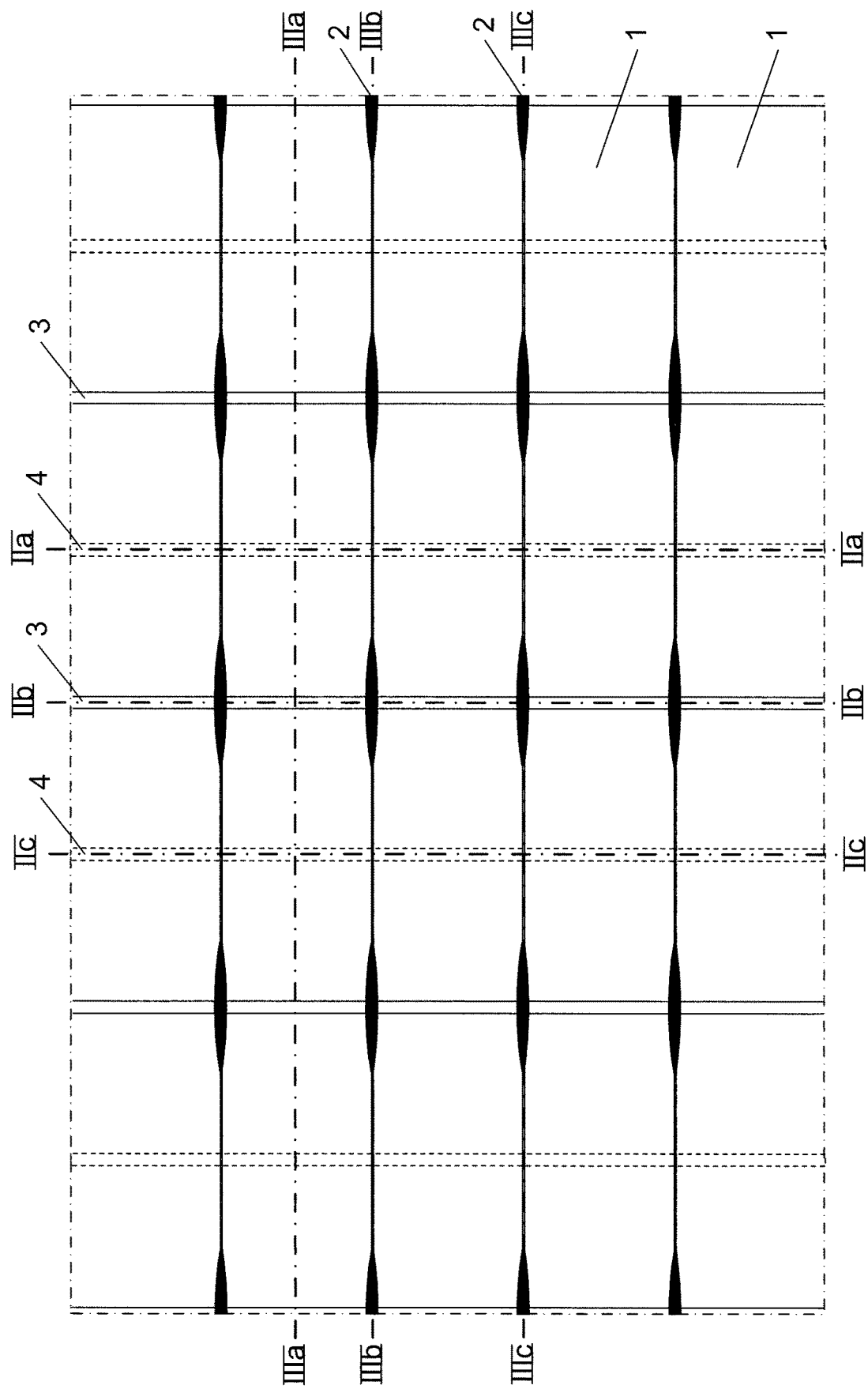

location of the cross-connections (16) against the second threads (6).

18 Claims, 3 Drawing Sheets

(52) U.S. Cl.
CPC ... *B32B 2307/416* (2013.01); *B32B 2307/726* (2013.01); *D10B 2403/024* (2013.01)

(58) Field of Classification Search
CPC .... B32B 2262/0238; B32B 2262/0246; B32B 2262/0253; B32B 2262/0276; B32B 2262/12; B32B 2307/3065; B32B 2307/4026; B32B 2307/41; B32B 2307/416; B32B 2307/726; B32B 2307/728; B32B 2419/00; B32B 27/12; B32B 3/14; B32B 5/024; B32B 5/026; B32B 5/028; B32B 5/06; B32B 5/08; B32B 5/12; B32B 5/26; B32B 5/263; D04B 21/14; D10B 2403/024; Y02A 40/25

See application file for complete search history.

(56) References Cited

FOREIGN PATENT DOCUMENTS

| | | |
|---|---|---|
| EP | 2 757 869 B1 | 4/2015 |
| WO | WO 90/08459 A1 | 8/1990 |
| WO | WO 2015/181007 A1 | 12/2015 |

OTHER PUBLICATIONS

International Written Opinion of corresponding PCT/EP2019/080736, dated Jan. 8, 2020, 6 pages.

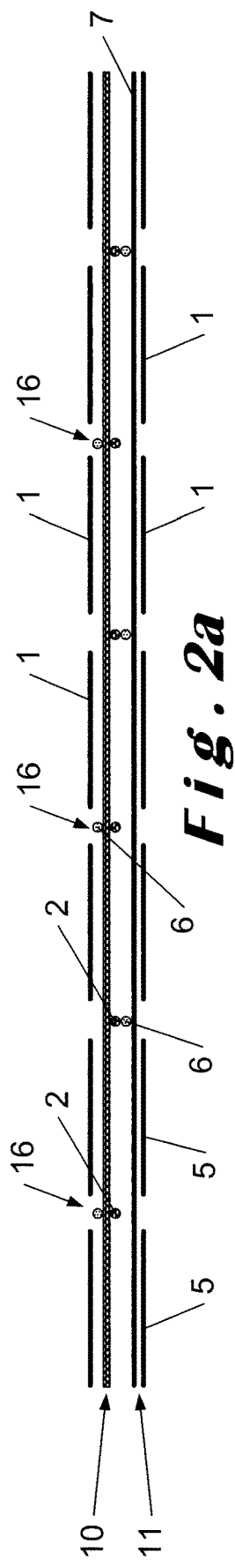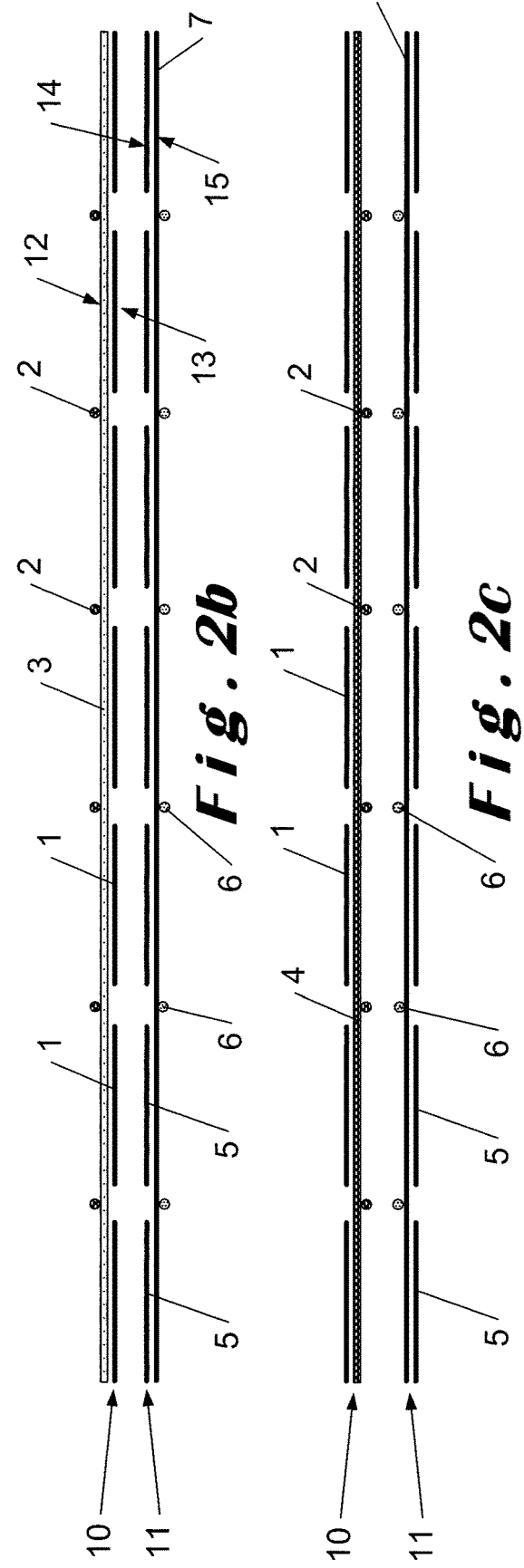

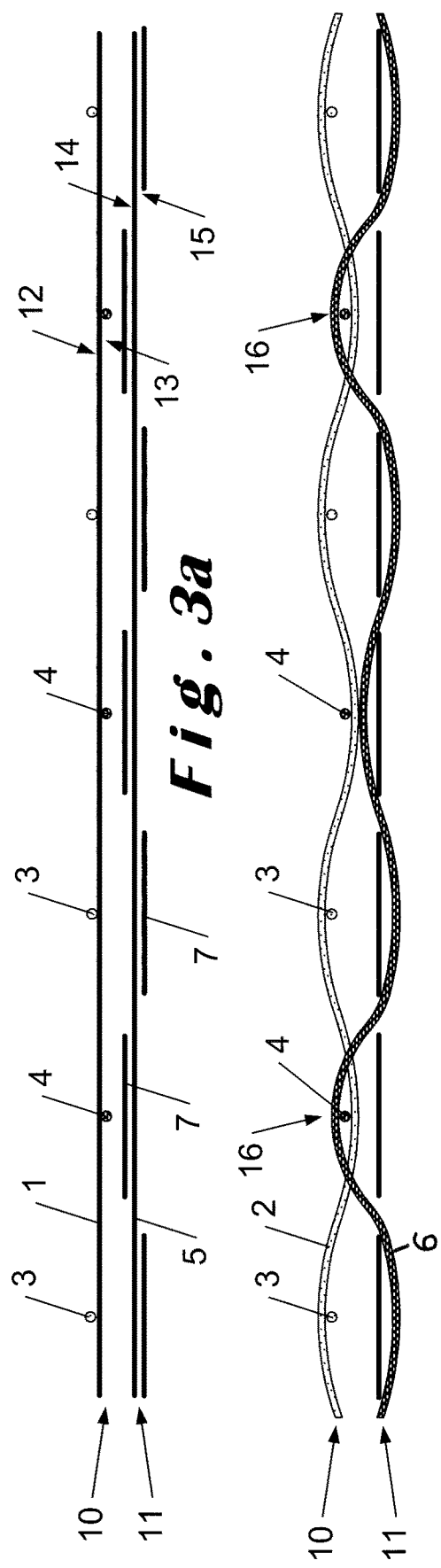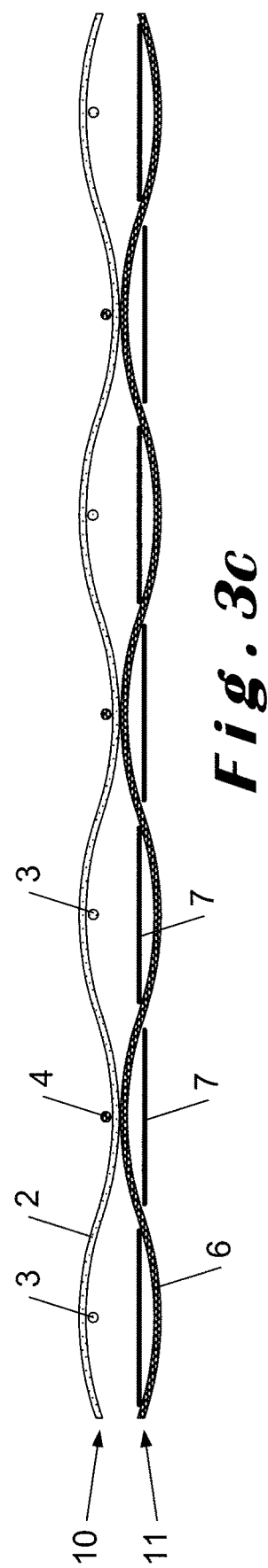

DARKENING SCREEN

CROSS-REFERENCE TO RELATED APPLICATIONS

This application is a U.S. National Phase Patent Application of International Application Number PCT/EP2019/080736, filed on Nov. 8, 2019, which claims priority to European Patent Application Number 18206073.1, filed on Nov. 13, 2018, the entire contents of each of which is incorporated herein by reference.

The present invention relates to a darkening screen having a hemispherical transmission measured in accordance with the standard WUR-TNO-NEN 2675:2018 of less than 1%, preferably of less than 0.1% and more preferably of less than 0.05%. The light reflecting darkening screen is especially intended for use in greenhouses.

The darkening screen comprises two fabrics, namely a first fabric having a light reflecting first face and an opposite second face, which first fabric comprises in machining direction first strips of film material and first threads in between the first strips, and, in cross machining direction, first yarns by means of which the first strips and the first threads are knitted or woven to one another; and a second fabric which has a first face and an opposite second face and which is applied with its first face against the second face of the first fabric, which second fabric comprises in machining direction second strips of film material and second threads in between the second strips, and, in cross machining direction, second yarns by means of which the second strips and the second threads are knitted or woven to one another. The first and the second threads of the first and the second fabric have water transporting capacity.

In the present specification, the term yarn has to be interpreted in a broad sense and embraces therefore yarns with all kinds of cross-sections and compositions. It therefore does not only embrace yarns with a mainly circular or oval cross-section, such as staple fibre yarn, multifilament yarn, monofilament yarn, etc. but also yarns with a mainly rectangular cross-section such as tape yarn.

Such a light reflecting darkening screen is disclosed in WO 2015/181007 and is put on the market under the name PhormiTex Eclipse®. This light reflecting darkening screen comprises two separate fabrics. The top fabric is a plain weave fabric which comprises, as warp yarns, an alternation of black PVC tapes laminated with aluminium foil and black spun modacryl yarns, and as weft yarns, an alternation of white spun modacryl yarns and black spun modacryl yarns. The white spun modacryl yarns extend above the aluminium top layer of the PVC tapes and underneath the modacryl yarns. The bottom fabric is also a plain weave fabric which comprises, as warp yarns, an alternation of black HDPE tapes and black spun modacryl yarns, and as weft yarns, black HDPE tapes. The screen has very good darkening capacities and is a so-called black out screen which is required for bringing short-day plants into blossom.

The darkening screen is fire retardant and has in particular a class 1 fire retardancy measured in accordance with the NEN NTA 8825:2018 fire test. To achieve this fire retardancy, the HDPE tapes have to contain a relatively large amount of a synergistic fire resistance composition.

Some features of the PhormiTex Eclipse® darkening screen could still be improved. Due to the presence of the tapes in the top and the bottom fabric the penetration of moisture through the screen is not optimal. As a result thereof, the atmosphere below the screen may remain quite humid. Moreover, water droplets can be formed by condensation against the lower surface of the screen and may fall onto the plants. Both a too humid atmosphere and water droplets falling onto the plants should be avoided to prevent diseases and damage to the plants, in particular to the flowers thereof.

As mentioned in WO 2015/181007 the two fabrics could be connected to each other to form an integrated screen. However, according to WO 2015/181007, the two fabric are preferably not connected to each other to ensure that the screen remains sufficiently flexible and to further improve the fire retardancy of the screen.

To connect both fabrics, WO 2015/181007 discloses the possibility to use an adhesive such as for example a glue or a hot melt. It is however clear that the presence of such an adhesive between both fabrics will further reduce the moisture transmission through the screen. WO 2015/181007 also discloses the possibility to use mechanical bonding processes such as for example stitching to connect both fabrics. A drawback thereof is however that the stitches will create openings in the two fabrics thereby increasing the light transmission through the screen.

Another known darkening screen is put on the market under the tradename Obscura®. This darkening screen also consists of two separate fabrics. Both the top and the bottom fabric consists of plastic tapes which are knitted together. The warp-knitted screen comprises the tapes alternating with the warp threads of the knitted structure. The warp-knitted structure of both single fabrics is disclosed for example in EP-B-2 757 869. The top fabric has either a white upper surface or an aluminium upper surface whilst the lower surface is black. The upper surface of the bottom fabric is also black whilst the lower surface thereof may be black or white.

As disclosed in EP-B-2 757 869 each individual fabric enables transport of water through its yarn framework from the bottom surface of the fabric to its upper fabric. When used as a single fabric, this enables to control the humidity of the atmosphere underneath the screen and to avoid condensation of water against the lower surface of the screen. However, one single fabric does not allow to obtain a black out screen as light can still penetrate between the tapes through the woven yarn structure. In order to avoid transmission of light through the screen two fabrics have to be applied on top of one another. It is clear that through such a double layered screen water transport is very limited and not sufficient to control the humidity of the atmosphere and the formation of droplets against the bottom surface of the screen.

An object of the present invention is to provide a new darkening screen which comprises two fabrics and which has improved moisture transporting properties whilst maintaining its low hemispherical light transmission.

To this end, the darkening screen according to the invention is characterised in that said first threads are aligned with said second threads and are situated, in a direction perpendicular to said first and second fabric, opposite to said second threads to form pairs of first and second threads, and in that in a number of said pairs of first and second threads the first thread is connected at different locations by cross-connections to the second thread to thereby fix the first fabric to the second fabric. The cross-connections preferably hold the first threads at least at the location of the cross-connections against the second threads.

Due to the fact that the first and the second threads, running in machining direction between the strips of film material, are connected to one another in different locations, no openings are made in the strips of film material nor are the strips of film material deformed so that also in this way no openings are created in the screen, as is for example the case in the double layer woven fabric structure as disclosed in U.S. Pat. No. 8,333,220. The light transmission of the double layer fabric is to be determined by means of the new standard WUR-TNO-NEN 2675:2018 which measures the hemispherical transmission instead of the transmission of light in a mainly perpendicular direction. For a double layer fabric, the new standard is more severe since light transmission has to be avoided in all directions thereby avoiding also diffuse light to penetrate through the screen.

In the screen according to the present invention the enhanced moisture transport through the screen is obtained first of all by the fact that the first and the second threads, which are present respectively in the first and the second fabric, are connected to one another and have water transporting capacity. Secondly, since the first threads are aligned with the second threads and are situated in a direction perpendicular to the screen opposite to one another, there are numerous locations, between the locations wherein the two fabrics are connected to one another, where the first threads are in contact with the second threads so that moisture can also be directly transmitted at these locations from the second threads to the first threads. When the both fabric are not connected to one another, as is the case in the above described PhormiTex Eclipse® and double fabric Obscura® screens, there are much less or even nearly no points of contact between the first and the second threads since first of all the first and second threads are not kept aligned and secondly since both fabrics are not fixed to one another so that they only contact each other locally.

Finally, it has been found quite surprisingly, that the fire retardancy of the screen is improved due to the cross-connections between the two fabrics, in contrast to the teachings of WO 2015/181007. The improved fire retardancy has the advantage that less or even no fire retarding additives have to be incorporated in the screen to be able to obtain the required fire retardancy as determined according to the NTA 8825:2010 fire test.

In an embodiment of the darkening screen according to the invention, said first strips of film material alternate in cross machine direction with said first threads and said second strips of film material alternate in cross machine direction with said second threads.

An advantage of this embodiment is that the strips of film material, extending in both fabrics in the machining direction, will not be deformed by any yarns running in the cross machining direction so that a more closed woven or knitted structure can be achieved for each fabric.

In an embodiment of the darkening screen according to the invention, said screen comprises at least 50, preferably at least 1000, more preferably at least 10 000 and most preferably at least 20 000 but less than 220 000, preferably less than 120 000, more preferably less than 80 000 and most preferably less than 60 000 cross-connections per square meter.

Less cross-connections per square enable to use wider strips and to reduce the number of possible slits between the parallel strips. A reduction of the number of cross-connection may also result in a more flexible screen. More cross-connections per square meter provide a larger moisture transporting capacity, either at the locations of the cross-connections itself and by holding the two fabric in a closer relation to one another so that there is more contact between the first threads of the upper fabric and the second threads of the lower fabric. Moreover, the more cross-connections per square meter, the better the fire resistance of the screen.

In an embodiment of the darkening screen according to the invention, said first fabric is a woven fabric, preferably a plain weave, and in that said second fabric is a woven fabric, preferably a plain weave.

A double woven fabric is easier to produce than a double knitted fabric. To connect the two woven fabrics, the weft yarns of the first fabric can easily be guided at the location of the cross-connections underneath instead of above the second threads of the second fabric to secure both fabrics to one another.

In an embodiment of the darkening screen according to the invention, the number of first yarns per unit of length in machining direction is substantially equal to the number of second yarns per unit of length in machining direction.

In this embodiment the first yarn can be applied easily in the direction perpendicular to said screen opposite the second yarns so that at the locations where the first threads extend between said first strips to the outer side of the screen a second yarn is provided which blocks the light which may pass at that location through the first fabric, especially when the second yarn is formed by a strip of film material.

In an embodiment of the darkening screen according to the invention, the number of first strips of film material per unit of length in cross machining direction is substantially equal to the number of second strips of film material per unit of length in cross machining direction.

In this embodiment the first and second strips of film material may have the same width to provide the best darkening effect since no unnecessary slits are produced in between these strips.

In an embodiment of the darkening screen according to the invention, said cross-connections are produced in a number of said locations, preferably in substantially all of said locations, by one of said first yarns passing at said location between the first thread situated at said location and the adjoining first strips of film material and between the second thread situated at said location and the adjoining second strips of film material.

No separate yarns are thus needed for producing the cross-connections. Moreover, the cross-connections can easily be produced only by lifting the second threads at these locations to a higher level so that they extend above instead of below the first weft yarn.

In an embodiment of the darkening screen according to the invention, said second yarns comprise further strips of film material.

By the combination of the second strips of film material in the machining direction and the further strips of film material in the cross machining direction, the hemispherical light transmission through the screen can be substantially reduced to zero, i.e. to a value smaller than 0.1% or even smaller.

Preferably, the further strips of film material are opaque and have preferably a substantially black upper and lower face.

The term "opaque" indicates that the film material itself is not transparent, i.e. the light transmission through this film material, measured in accordance with WUR-TNO-NEN 2675:2018, is smaller than 0.1% or preferably even smaller than 0.05%. The black upper and lower face has the advantage that any light transmitted by the first fabric and arriving onto the black surface of the film material is absorbed thereby. In other words, reflections of light in between the two fabrics is avoided or at least reduced. A black upper and lower face is preferred since during the production process the strip of film material may be turned upside down, especially when used in the weft direction. The first and second strips of film material, extending in the machining or warp direction, can be more easily prevented from being turned upside down. At such a turn, an opening could be formed in the fabric. Moreover, when the first strips of film material have a light reflecting upper surface and a dark bottom surface, they may clearly not twist as otherwise the light reflecting properties of the upper side of the screen are reduced whilst more light can reflect in between the two fabrics.

In an embodiment of the darkening screen according to the invention, said further strips of film material have a degree of coverage of at least 100%, preferably of at least 105% and more preferably of at least 110%.

When the degree of coverage is equal to 100%, the further strips of film material lie edge to edge against one another and are compressed/deformed somewhat at the locations where the second threads pass between the further strips from the underside to the upper side of the second fabric and vice versa. When the degree of coverage is larger than 100%, the further strips of film material overlap each other partially. With such high degrees of coverage, the light transmission through the second fabric can be reduced to a minimum and even substantially to zero (i.e. to a value smaller than 0.1% or even smaller than 0.05%).

In an embodiment of the darkening screen according to the invention, said second strips of film material have a degree of coverage of at least 100%, preferably of at least 105% and more preferably of at least 110%

When the degree of coverage is equal to 100%, the second strips of film material lie edge to edge against one another and are compressed/deformed somewhat at the locations where the second threads pass between the second strips from the underside to the upper side of the second fabric and vice versa. When the degree of coverage is larger than 100%, the second strips of film material overlap each other partially or are deformed against one another. With such high degrees of coverage, the light transmission through the second fabric can be reduced to a minimum and even substantially to zero (i.e. to a value smaller than 0.1% or even smaller than 0.05%).

In an embodiment of the darkening screen according to the invention, said first strips of film material have a degree of coverage of at least 85%, preferably of at least 90% and more preferably of at least 95%.

The darkening effect of the screen is for a large extend obtained by means of the second fabric, especially for light falling in substantially at right angles to the surface of the screen. However, for the hemispherical transmission, measured in accordance with the standard WUR-TNO-NEN 2675:2018, also light falling in under a small angle may not be able to pass through the screen. In this respect, the first fabric should also reflect or absorb as much as possible of the light falling onto the screen. A large light reflecting surface is also important to avoid heating of the screen and to keep the temperature underneath the screen sufficiently low. Consequently, a large portion of the light falling on the surface of the screen is preferably reflected instead of absorbed.

In an embodiment of the darkening screen according to the invention, said first strips of film material are opaque.

In an embodiment of the darkening screen according to the invention, said second strips of film material are opaque. Preferably the first and the second strips of film material are opaque.

As defined hereabove, the term "opaque" indicates that the film material itself is not transparent, i.e. the light transmission through this film material, measured in accordance with WUR-TNO-NEN 2675:2018, is smaller than 0.1% or preferably even smaller than 0.05%.

In an embodiment of the darkening screen according to the invention, said first threads and said second threads are substantially black.

Since the first and the second threads are situated respectively in between the first and second strips of film material, black first and second threads are advantageous in that they absorb the light so that when the first and second threads penetrate respectively between the first and second strip, they do not reflect light underneath these strips. The use of black first and second threads thus reduce the transmission of light through the screen.

In an embodiment of the darkening screen according to the invention, the second face of said first strips of film material and the first face of said second strips of film material are substantially black.

The second face of the first strips of film material is directed towards the first face of the second strips of film material. Any light that may have penetrated through the first fabric and that arrives onto the second strips of film material will mainly be absorbed by the black upper surfaces of these second strips. An portion of the light that may be reflected by the black strips, will be absorbed by the black bottom surface of the first strips of film material. In this way, light is maximally absorbed within the interior of the screen so that penetration thereof through the screen is prevented.

In an embodiment of the darkening screen according to the invention, the screen is fire retardant and meets class 1 for fire spread determined in accordance with the NEN NTA 8825:2018 fire test.

Such a fire retardancy is important for a safe use of the screen, in particular in green houses. As described hereabove, the screen in accordance with the invention can be rendered more easily fire retardant. The first and the second threads and the first yarns are preferably made of a material that is difficult to ignite, and are preferably made of a polyester material or of a modacrylic material. No or less fire retardant additives have to be included in these yarn materials.

In view of the fire retardancy, the first strips of film material can be made of a PVC material (polyvinyl chloride) which comprises on top a metal foil, in particular an aluminium foil laminated thereto. The film material of these first strips is thus a laminate. The metal foil preferably has a thickness of at most 250 µm, more preferably at most 100 µm, most preferably at most 50 µm to ensure that the top fabric remains flexible enough to allow opening of the screen. Instead of an aluminium foil, the upper part of the first strips of film material may comprise a white plastic, in particular a white PVC material. This material contains white pigments, such as titanium dioxide, whilst the black PVC material contains black pigments, such as carbon black. Normally no fire retardant additives have to be included in the PVC material, especially not if it is covered with an aluminium foil.

Instead of being made of PVC, the first strips of film material may also be made of polyvinylidene-chloride (PVDC), polychlortrifluorethylene (PCTFE), polyvinylfluoride (PVF), fluorinated ethylene propylene (FEP), which is a copolymer of hexafluoropropylene and tetrafluorethylene, polytetrafluorethylene (PTFE), ethylene-tetrafluorethylene (E/TFE), which is a copolymer of tetrafluorethylene and ethylene. Preferably, the halogen-containing polymeric strips are however made of PVC to improve the fire retardancy of the screen.

The polymeric strips may have a thickness of 250 µm or less, preferably 200 µm or less, more preferably 150 µm or less, most preferably 100 µm or less, to ensure that the top fabric remains sufficiently flexible. Preferably, the polymeric strips has a thickness of 50 µm or more, preferably 60 µm or more, more preferably 75 µm or more, to ensure good processing of the strips into the top fabric.

The polymeric strips may have a width of at least 0.10 cm, preferably at least 0.15 cm, more preferably at least 0.20 cm, to obtain sufficient surface coverage in the top fabric under economic conditions. Preferably, the halogen-containing polymeric strips have a width of at most 2.00 cm, preferably at most 1.50 cm, preferably at most 1.00 cm, more preferably at most 0.50 cm, most preferably at most 0.30 cm, to ensure that the top fabric remains flexible enough to allow easy installation of the screen.

The strips of film material of the second fabric, i.e. the second strips of film material, and the further strips of film material, are preferably made of a polyolefin material, more preferably of HDPE (high density polyethylene). The fire retardant additives as disclosed in WO 2015/181007 may be included in this polyolefin material, preferably however in smaller amounts. Optionally, no fire retardant additives are added to the polyolefin material, in particular not to the HDPE material.

The strips of film material of the second fabric may comprise any type of polyolefin polymer, including polypropylenes, such as for example atactic polypropylene, isotactic polypropylene or syndiotactic polypropylene, and polyethylenes, such as for example low density polyethylene (LDPE), linear low density polyethylene (LLDPE), high density polyethylene (HDPE), and/or copolymers and/or blends thereof. The polyolefin tapes comprised in the bottom fabric comprise preferably high density polyethylene to achieve an optimum balance of costs, durability and stiffness of the bottom fabric and to improve the fire retardancy of the screen.

In an embodiment of the darkening screen according to the invention, said first and second threads comprise multifilament and/or spun yarns.

Such yarns may have higher water transporting capacity either by absorption of water in the material of the yarns itself or by capillary action by the pores provided in or between the fibres or filaments of the yarns. Water may not only be transported as liquid but also as vapour.

The linear density (expressed in the unit tex, i.e. the weight of a yarn in gram per 1000 m length) of the first and/or second threads may in principle vary widely. The linear density of these threads may be at least 10 tex, preferably at least 20 tex, more preferably at least 40 tex, most preferably at least 50 tex, to facilitate installation of the screen into the greenhouse and/or to allow opening and closing of the screen to allow sunlight to enter the greenhouse if desired. Preferably, the linear density of the first and/or second threads is at most 200 tex, preferably at most 100 tex, more preferably at most 75 tex, to ensure that the top fabric remains sufficiently flexible.

Preferably, the first and/or second threads are modacryl threads to allow transfer of moisture through the top fabric of the screen and to improve the fire retardancy of the screen.

In an embodiment of the darkening screen according to the invention, said first yarns have water transporting capacity, said first yarn preferably comprising multifilament and/or spun yarns.

When the first yarn have also water transporting capacity, they can take up water from the first threads and can transport this water laterally either on the upper side of the screen so that the water can evaporate from the screen or underneath the first strips of film material to an adjacent first thread which may transport the water further to the upper side of the screen.

In an embodiment of the darkening screen according to the invention, the darkening screen has, in the machining direction, a capillary rise of tap water as measured according to ISO 9073-6:2000 of at least 5 mm, preferably at least 10 mm after 20 minutes.

The water can thus be transported in the machining direction of the screen through the first and second threads so that the water (liquid or vapour) can be transported from the lower side of the screen to the upper side thereof.

The linear density (expressed in the unit tex, i.e. the weight of a yarn in gram per 1000 m length) of the first yarns may vary widely. The linear density of these first yarns may be at least 20 tex, preferably at least 40 tex, more preferably at least 50 tex, to ensure a sufficiently strong connection in the top fabric. Preferably, the linear density of the first yarns is at most 200 tex, preferably at most 100 tex, more preferably at most 75 tex, to ensure that the top fabric remains sufficiently flexible.

Other advantages and particularities of the invention will become apparent from the following description of some particular embodiments of the screen according to the invention. This description is only given by way of example and is not intended to limit the scope of the invention as defined in the appendant claims. The reference numerals used in this description relate to the annexed drawings wherein:

FIG. 1 is a top plan view, on an enlarged scale, on the upper surface of a darkening screen according to the invention;

FIGS. 2a to c are cross sectional views according to lines II a to c of FIG. 1; and FIGS. 3a to c are sectional views, in the longitudinal/machining direction, according to lines III a to c of FIG. 1.

The darkening screen according to the present invention is in particular intended for darkening a green house. It enables in particular to bring short-day plants into blossom when the day length is still too long. An effective shielding of the light is required, in particular also of diffuse light, since the photo reaction of plants requires only a minimum amount of light. The hemispherical light transmission measured in accordance with the standard WUR-TNO-NEN 2675:2018 should therefore be less than 1%, preferably less than 0.1% and more preferably less than 0.05%. In order to avoid a too high temperature underneath the screen, the upper surface thereof should be light reflective.

The darkening screen comprises two fabrics, namely a first or upper fabric 10 and a second or lower fabric 11. The upper fabric 10 has a light reflecting first or upper face 12 and an opposite second or lower face 13 which is preferably black to maximise light absorption and to minimise light reflection. The lower fabric 11 also has a first or upper face 14 and an opposite second or lower face 15. The upper face 14 is preferably black to maximise light absorption and to minimise light reflection. The lower face 15 of the lower fabric 11 can either be light reflective or black. A dark lower face 15 is intended to absorb any light to make the space underneath the screen as dark as possible. A light reflecting lower face 15 still allows to darken the space underneath the screen but is intended to reflect the light when the space underneath the screen is artificially lightened.

The reflective upper face 12 of the upper fabric 10 can be achieved by means of a metal foil, in particular of an aluminium foil. Such a foil also assists in preventing heat losses from the space underneath. The reflective upper face 12 can also be achieve by means of a white layer, in particular a white coating layer or a plastic layer which comprises a white pigment such as titanium dioxide. An advantage of a white layer is that it emits more heat so that it remains cooler underneath the screen.

The upper fabric 10 comprises in machining direction, i.e. in the warp direction in case of a woven or a warp-knitted fabric, first strips 1 of film material and first threads 2 in between the first strips 1. The first strips 1 preferably alternate in the cross machining direction with the first threads 2. In this cross machining direction, i.e. in the direction transverse to the machining direction, it comprises first yarns 3, 4 by means of which the first strips 1 and the first threads 2 are knitted or woven to one another.

The first strips 1 can be formed by filling strips contained in a warp knitted fabric as disclosed for example in EP-B-2 757 869. The warp knitted fabric comprises the first threads 2 as longitudinal warp threads and the first yarns 3, 4 as transverse weft threads. The first yarns 3, 4 connect the adjacent warp threads 2 both above the first strips 1 and underneath the first strips 1. The first yarns comprises light, in particular white yarns 3 extending above the first strips 1 and dark, in particular black yarns 4, underneath the first strips 1. The first strips 1 are thus contained as filling strips in the knitted structure and are not deformed by the first yarns 3, 4 as these first yarns mainly extend parallel to the upper and lower surface of the first strips 1. For further details of this knitted structure, the description and the drawings thereof as given in EP-B-2 757 869 are included herein by way of reference.

The figures illustrate an embodiment wherein the upper fabric 10 is a woven fabric. The upper fabric 10 has a plain weave pattern but other weave patterns are also possible such as a satin weave or a twill pattern. The warp yarns are formed by an alternation of the first strips 1 of film material and the first threads 2. The first yarns 3, 4 comprise light, in particular white yarns 3, and dark, in particular black yarns 4. The white yarns 3 extend over the upper surface of the first strips 1 and underneath the first threads 2 whilst the black yarn 4 extend underneath the first strips 1 and above the first threads 2.

The first strips 1 have a light reflecting upper surface forming the light reflecting upper face 12 of the upper fabric 10. The first strips 1 are opaque. The first strips 1 can be made of a dark plastic foil, in particular a black PVC foil, which is provided with a light, in particular a white coating. The first strips 1 may also be made of a laminated foil comprising a bottom layer, which comprises a black pigment such as carbon black, and a white top layer which comprises a white pigment such as titanium dioxide. Instead of the white top layer, the first strips may comprise a metal foil, in particular an aluminium foil, laminated onto the bottom layer.

The first strips of film material have preferably a degree of coverage of at least 85%, preferably of at least 90% and more preferably of at least 95%. In the figures, which are only schematic drawings, a gap is present between the different strips of film material. In reality this gas is however smaller. The coverage degree of the first strips 1 is for example 97% so that the gaps between the first strips 1 have only a width of about 3.1% of the width of the first strips 1.

The lower fabric 11 comprises in machining direction, i.e. in the warp direction in case of a woven or a warp-knitted fabric, second strips 5 of film material and second threads 6 in between the second strips 5. The second strips 5 preferably alternate in the cross machining direction with the second threads 6. In this cross machining direction, i.e. in the direction transverse to the machining direction, it comprises second yarns 7 by means of which the second strips 5 and the second threads 6 are knitted or woven to one another.

Just as in the upper fabric the second strips 5 can be formed by filling strips contained in a warp knitted fabric as disclosed for example in EP-B-2 757 869. The warp knitted fabric comprises the second threads 6 as longitudinal warp threads and the second yarns 7 as transverse weft threads. The second yarns 7 connect the adjacent warp threads 6 both above the second strips 5 and underneath the second strips 5. When the lower face 15 of the lower fabric 15 is light reflecting the second yarns 7 may comprise light, in particular white yarns extending underneath the second strips 5 and dark, in particular black yarns, above the second strips 5. When the lower face 15 of the lower fabric 15 is dark, in particular black, the second yarns 7 may only comprise dark, in particular black yarns, extending both underneath and above the second strips 5. The second strips 5 are contained as filling strips in the knitted structure and are not deformed by the second yarns 7 as these second yarns 7 mainly extend parallel to the upper and lower surface of the second strips 5. For further details of this knitted structure, the description and the drawings thereof as given in EP-B-2 757 869 are included herein by way of reference.

The figures illustrate an embodiment wherein also the lower fabric 11 is a woven fabric. The lower fabric 11 has a plain weave pattern but other weave patterns are also possible such as a satin weave or a twill pattern. The warp yarns are formed by an alternation of the second strips 5 of film material and the second threads 6. When the lower face 15 of the lower fabric 15 is light reflecting the second yarns 7 may comprise light, in particular white yarns extending underneath the second strips 5 and dark, in particular black yarns, above the second strips 5. When the lower face 15 of the lower fabric 15 is dark, in particular black, the second yarns 7 may only comprise dark, in particular black yarns, extending both underneath and above the second strips 5.

In order to further avoid transmission of light through the screen, the second yarns 7 preferably comprise further strips of film material. These further strips 7 of film material are opaque and have preferably a black upper and lower face. However, as described hereabove, the further strips 7 of film material may alternatingly comprise completely black and completely white strips of film material. The further strips 7 of film material have preferably a degree of coverage of at least 100%, preferably of at least 105% and more preferably of at least 110%, for example 114%.

The second strips 5 may have a light reflecting bottom surface forming the light reflecting lower face 15 of the lower fabric 11. Usually the second strips 5 are however completely dark, having a dark upper and lower surface. The second strips 5 are opaque. The second strips 5 can be made of a dark plastic foil, in particular a black HDPE foil. In case the lower face 15 of the lower fabric 11 should be light reflecting the black HDPE foil may be provided with a light, in particular a white coating. The second strips 5 may also be made of a laminated foil comprising a top layer, which comprises a black pigment such as carbon black, and a white bottom layer which comprises a white pigment such as titanium dioxide.

The second strips of film material have preferably a degree of coverage of at least 100%, preferably of at least 105% and more preferably of at least 110%. In the figures, which are only schematic drawings, a gap is present between the different strips of film material. In reality this gap is however smaller or is even non-existing especially when the strips overlap one another. The coverage degree of the second strips 5 is for example 114% to avoid as much as possible gaps between the second strips 5.

In order to allow transport of water, as liquid and/or as vapour, through the screen, the first threads 2 and the second threads 6 have water transporting capacity. The first threads 2 comprise preferably multifilament and or spun yarns and also the second threads 6 comprise preferably multifilament and or spun yarns. Also the first yarns 3, 4 have preferably water transporting capacity, the first yarns 3, 4 preferably comprising multifilament and/or spun yarns.

The water transporting capacity of the first and second threads is preferably so large that the darkening screen has, in the machining direction, a capillary rise of tap water as measured according to ISO 9073-6:2000 of at least 5 mm, preferably at least 10 mm after 20 minutes.

In the screen according to the present invention the first threads 2 of the upper fabric 10 are aligned with the second threads 6 of the lower fabric 11 and are situated, in a direction perpendicular to the surface of the screen, opposite to the second threads 6 to form pairs of first and second threads. Moreover, in a number of these pairs of first 2 and second threads 6 the first thread 2 is connected at different locations by cross-connections 16 to the second thread 6 to thereby fix the first fabric 10 to the second fabric 11.

By connecting the first and second threads 2, 6 to one another, in particular at a location in between the two planes formed by the first strips 1 of film material and the second strips 5 of film material, the small hemispheral light transmission of the screen is maintained, and is in particular, as measured in accordance with WUR-TNO-NEN 2675:2018, less than 1%, preferably less than 0.1% and more preferably even less than 0.05%.

In the case of the warp-knitted upper and lower fabric described hereabove, warp threads 2, 6 of both fabrics can be knitted or otherwise fixed to one another. It is for example possible to apply an additional yarn in the machining direction through a number of the pairs of opposite first and second warp threads, in particular through the loops formed by the knitted warp threads, to connect them to one another. It is also possible to tie the opposite warp threads together at a number of locations. Finally, the first warp threads 2 can be knitted together with the second warp threads 6 or the first and the second threads 2, 6 can be formed by one single thread extending in and in between the first and the second fabrics.

In the darkening screen illustrated in the drawings, the cross-connections 16 between the woven upper 10 and lower fabric 11 are achieved by means of a number of the black first yarns 4 of the upper fabric 10. As can be seen in FIGS. 2a and 3b, the black first yarns 4 extends at the location of the cross-connections 16 above the first threads 2 of the upper fabric 10 but underneath the second threads 6 of the lower fabric 11. More particularly, as can be seen in particular in FIG. 2a, the black first yarn 4 passes at the location of a cross-connection 16 between the first thread 2 situated at this location and the adjoining first strips 1 of film material and between the second thread 6 situated at this location and the adjoining second strips 5 of film material.

A maximum number of cross-connections 16 can be achieved when a cross-connection 16 is made at each crossing of a black first yarn 4 with a second thread 6. Such a large number of cross-connections 16 is however not required and not preferred as it may affect the flexibility of the screen. In the embodiment illustrated in the drawings, the black first yarns 4 and also the second threads 6 are only alternatingly used for producing cross-connections 16. In the Example wherein there are 1.9 black first yarns 4 per centimetre and 3.8 second threads per centimetre, the screen can comprise at most 72 200 cross-connections per square meter and comprises, in the example illustrated in the drawings, 8550 cross-connections per square meter. In case all the second threads 6 are used to produce the cross-connections 16, this would result in 36 100 cross-connections 16 per square meter. An advantage of more cross-connections 16 is that an increase transport of water (liquid or vapour) from the lower side to the upper side of the screen can be achieved.

In the screen illustrated in the drawings, the number of first yarns 3, 4 per unit of length in machining direction is substantially equal to the number of second yarns 7 per unit of length in machining direction. In this way, it is easy to apply the first yarns 3, 4 opposite to the second yarns 7 so that the cross-connections 16 can easily be obtained by means of the second threads 6 which are woven through the second yarns 7. Moreover, the number of first strips 1 of film material per unit of length in cross machining direction is equal to the number of second strips 5 of film material per unit of length in cross machining direction. In this way, it is easy to apply the first threads 2 opposite to the second threads 6 so that the cross-connection 16 can easily be realised and also so that water can be transmitted from the second threads 6 to the first threads 2 not only at the location of the cross-connections 16 but also in between the cross-connections 16 where the first threads 2 are held against the second threads 6.

An advantage of the cross-connections 16 is that the fire retardancy of the screen is substantially improved compared to a same screen wherein the two fabrics are not connected by means of cross-connections 16.

The different strips, yarns and threads can be made of different materials. These materials can be fire resistant as such or can be rendered fire resistant by including fire resistant additives therein.

EXAMPLE

In this example two woven screens were produced as illustrated in the drawings, with a different number of cross-connections, and a comparative screen was produced with the same upper and lower woven fabric but with no cross-connections. The following yarns were used:

TABLE 1

Properties of the yarns used in the screen of the example

| Yarn with ref. numeral | material | width | tex | yarns/cm | coverage |
| --- | --- | --- | --- | --- | --- |
| First strips (1) | Alu foil/black FR PVC film | 2.55 mm | 214 | 3.8 | 97% |
| First threads (2) | Spun black Kanecaron ® fibres | | 55 | 3.8 | |

TABLE 1-continued

Properties of the yarns used in the screen of the example

| Yarn with ref. numeral | material | width | tex | yarns/cm | coverage |
|---|---|---|---|---|---|
| First ecru yarns (3) | Spun ecru Kanecaron ® fibres | | 74 | 1.9 | |
| First black yarns (4) | Spun black Kanecaron ® fibres | | 62 | 1.9 | |
| Second strips (5) | HDPE fire resistant tape yarn | 3.00 mm | 100 | 3.8 | 114% |
| Second threads (6) | Spun black Kanecaron ® fibres | | 55 | 3.8 | |
| Second yarns (7) | HDPE fire resistant tape yarn | 3.00 mm | 100 | 3.8 | 114% |

The comparative screen was produced by weaving two separate fabrics in the same way as illustrated in the drawings but with no cross-connections.

The first screen according to the invention was also produced as illustrated in the drawings, but with fewer cross-connections 16. It had only a small amount of cross-connections, namely 2256 per square meter. Only every fourth second thread 2 and only every eight black first yarn 4 was used to make the cross-connections 16.

The second screen according to the invention was also produced as illustrated in the drawings, but with more cross-connections 16. It had a lot of cross-connections, namely 36 100 per square meter. Every second thread 2 was used to make the cross-connections 16 whilst the black first yarns 4 were alternatingly used for producing the cross-connections 16.

The light transmission of the lower fabric 11 of the comparative screen had a light transmission of only 0.04%. This very small light transmission of 0.04% was maintained in the first and the second screen produced in accordance with the present invention.

Due to the cross-connections between the two fabrics, and due to the fact that in the screens according to the invention the first and the second threads are held in contact with one another also in locations where no cross-connection is provided, the water transport capacity of the screen from its lower to its upper surface is improved.

Surprisingly, also the fire retardancy of the screen is improved. In Table 2 the different

TABLE 2

Distances, in cm, of flame propagation measured in accordance with NEN NTA 8825: 2018 for 1 and 3 layers of sample under an angle of 30°

| Test with 1 layer | 1a | 1b | 1c | 1d | 1e | 1f | average |
|---|---|---|---|---|---|---|---|
| Comparative example: two loose fabrics (0 connections/m²) | 5 | 7 | 3 | 1 | 6 | 7 | 7.2 |
| | 20 | 5 | 24 | 2 | 4 | 4 | |
| | 11 | 2 | | 6 | 4 | 4 | |
| | 10 | 4 | | 12 | 18 | 3 | |
| | | 5 | | 15 | | 2 | |
| | | | | 5 | | 5 | |
| | | | | | | 8 | |
| Screen with few cross-connections (2256/m²) | 5 | 3 | 2 | 1 | 3 | 3 | 2.2 |
| | 2 | 3 | 1 | 1 | 1 | 1 | |
| | 2 | 1 | 1 | 4 | 2 | 2 | |
| | 1 | 1 | 2 | 4 | 3 | 1 | |
| | 1 | 1 | 7 | 3 | 1 | 1 | |
| | 1 | 1 | 5 | 1 | 1 | 1 | |
| | 1 | 1 | 2 | 1 | 3 | 1 | |
| | 1 | 5 | 4 | 2 | 4 | 4 | |
| | 2 | 4 | 6 | | | 1 | |
| Screen with many cross-connections (36100/m²) | | 1 | | | 1 | | 1.8 |
| | | 2 | | | 2 | | |
| | | 1 | | | | | |
| | | 1 | | | | | |
| | | 2 | | | | | |
| | 6 | 5 | | | | | |
| | 1 | 1 | | | | | |
| | 1 | 1 | | | | | |
| | 1 | 1 | | | | | |
| | 1 | 1 | | | | | |
| | 1 | 1 | | | | | |
| | 1 | 1 | | | | | |
| | 1 | 1 | | | | | |
| | 7 | 1 | | | | | |

| Test with 3 layers | 2a | 2b | 2c | 2d | 2e | 2f | average |
|---|---|---|---|---|---|---|---|
| Comparative example: two loose fabrics (0 connections/m²) | 6 | 14 | 10 | 14 | 4 | 5 | 12.1 |
| | 2 | 20 | 16 | 12 | 9 | 3 | |
| | 12 | 15 | 18 | 14 | 7 | 8 | |
| | 30 | | | 6 | 24 | 19 | |
| | | | | 10 | | | |
| Screen with few cross-connections (2256/m²) | 5 | 4 | 4 | 5 | 3 | 4 | 6.1 |
| | 1 | 11 | 5 | 2 | 1 | 14 | |
| | 2 | 10 | 9 | 3 | 4 | 3 | |
| | 19 | 10 | 2 | 6 | 3 | 23 | |
| | 5 | | 2 | 2 | 5 | | |
| | 3 | | 4 | 2 | 14 | | |
| | | | 10 | 11 | 2 | | |

It can be seen that even with only a small amount of cross-connections, the distance of flame propagation is reduced considerably. In this way, it is more easy to obtain a screen which meets class 1 for fire spread determined in accordance with the NEN NTA 8825:2018 fire test. In other words a smaller amount of fire retardant additives have to be included in the screen, which is not only less costly but which may also have an advantageous effect on the mechanical properties of the screen.

The invention claimed is:

1. A darkening screen having a hemispherical transmission measured in accordance with the standard WUR-TNO-NEN 2675:2018 of less than 1%, which darkening screen comprises:

a first fabric having a light reflecting first face and an opposite second face, which first fabric comprises in machining direction first strips of film material and first threads in between the first strips, and, in cross machining direction, first yarns by means of which the first strips and the first threads are knitted or woven to one another; and a second fabric which has a first face and an opposite second face and which is applied with its first face against the second face of the first fabric, which second fabric comprises in machining direction second strips of film material and second threads in between the second strips, and, in cross machining direction, second yarns by means of which the second strips and the second threads are knitted or woven to one another, wherein said first and said second threads have water transporting capacity, characterised in that said first threads are aligned with said second threads and are situated, in a direction perpendicular to said first and second fabric, opposite to said second threads to form pairs of first and second threads, and in that in a number of said pairs of first and second threads the first thread is connected at different locations by cross-connections to the second thread to thereby fix the first fabric to the second fabric.

2. A darkening screen according to claim 1, characterised in that said first strips of film material alternate in cross machine direction with said first threads and said second strips of film material alternate in cross machine direction with said second threads.

3. A darkening screen according to claim 1, characterised in that said screen comprises at least 50, preferably at least 1000, more preferably at least 10 000 and most preferably at least 20 000 but less than 220 000, preferably less than 120 000, more preferably less than 80 000 and most preferably less than 60 000 cross-connections per square meter.

4. A darkening screen according to claim 1, characterised in that said first fabric is a woven fabric, preferably a plain weave, and in that said second fabric is a woven fabric, preferably a plain weave.

5. A darkening screen according to claim 4, characterised in that the number of first yarns per unit of length in machining direction is substantially equal to the number of second yarns per unit of length in machining direction.

6. A darkening screen according to claim 4, characterised in that the number of first strips of film material per unit of length in cross machining direction is substantially equal to the number of second strips of film material per unit of length in cross machining direction.

7. A darkening screen according to claim 4, characterised in that said cross-connections are produced in a number of said locations, preferably in substantially all of said locations, by one of said first yarns passing at said location between the first thread situated at said location and the adjoining first strips of film material and between the second thread situated at said location and the adjoining second strips of film material.

8. A darkening screen according to claim 1, characterised in that said second yarns comprise further strips of film material.

9. A darkening screen according to claim 8, characterised in that said further strips of film material are opaque and have preferably a substantially black upper and lower face.

10. A darkening screen according to claim 9, characterised in that said further strips of film material have a degree of coverage of at least 100%, preferably of at least 105% and more preferably of at least 110%.

11. A darkening screen according to claim 1, characterised in that said second strips of film material have a degree of coverage of at least 100%, preferably of at least 105% and more preferably of at least 110%.

12. A darkening screen according to claim 1, characterised in that said first strips of film material have a degree of coverage of at least 85%, preferably of at least 90% and more preferably of at least 95%.

13. A darkening screen according to claim 1, characterised in that said second strips of film material are opaque and/or said first strips of film material are opaque.

14. A darkening screen according to claim 1, characterised in that said first threads and said second threads are substantially black and/or the second face of said first strips of film material and the first face of said second strips of film material are substantially black.

15. A darkening screen according to claim 1, characterised in that the screen is fire retardant and meets class 1 for fire spread determined in accordance with the NEN NTA 8825:2018 fire test.

16. A darkening screen according to claim 1, characterised in that said first and second threads comprise multifilament and/or spun yarns.

17. A darkening screen according to claim 1, characterised in that the darkening screen has, in the machining direction, a capillary rise of tap water as measured according to ISO 9073-6:2000 of at least 5 mm, preferably at least 10 mm after 20 minutes.

18. A darkening screen according to claim 1, characterised in that said first yarns have water transporting capacity, said first yarns preferably comprising multifilament and/or spun yarns.

* * * * *